July 31, 1934. W. J. DONOHUE 1,968,031
APPARATUS FOR AND METHOD OF SEPARATING SUSPENDED SOLIDS
FROM LIQUIDS BY SEDIMENTATION OR SETTLING
Filed Nov. 21, 1931 5 Sheets-Sheet 3

Patented July 31, 1934

1,968,031

UNITED STATES PATENT OFFICE 1,968,031

APPARATUS FOR AND METHOD OF SEPARATING SUSPENDED SOLIDS FROM LIQUIDS BY SEDIMENTATION OR SETTLING

William J. Donohue, Chicago, Ill.

Application November 21, 1931, Serial No. 576,500

17 Claims. (Cl. 210—55)

My invention relates to an apparatus for and method of separating suspended solids from liquids by sedimentation or settling, and it is particularly adaptable for separation of such solids where the greater perecntage of the mass treated is liquid. My invention finds utility in any environment where this problem of separation is involved, including sewage treatment, water treatment, industrial waste treatment, the handling and processing of ores, and the manufacture of sugar and paper.

It is well known that in the separation of solids from liquid by sedimentation or settling, best results are obtained by causing the mass which is to be separated to flow through the settling chamber from point of entry of the mass to point of discharge of the clear liquid at a predetermined slow rate; wherefore, by the time the mass has reached a certain point in the line of flow through the settling chamber, the solids have separated and settled so that clear liquid flows from that point to the point of discharge or draw-off. Structures employing multiple trays heretofore used for the foregoing purpose have been mainly of a circular radial-flow type, the unseparated mass being fed into the separation chamber (which is usually of circular form) and flowed radially over the settling surface therein, the clear liquid discharge or draw-off point being located radially remote from the point of complete separation of the solids. Obviously, therefore, with such prior structures, and bearing in mind the maintenance of a predetermined rate of mass and clear liquid flow to insure proper separation and settling, increase of the settling area, involving increase in radial flow distance, of such prior structures does not result in proportionate increase in separation capacity; wherefore, in such prior structures, increase in separation capacity occasions much unnecessary expense, wasted installation space, and wasted settling area. It has not been possible with prior structures of circular multiple tray construction to remove the settled solids from the trays as efficiently and as rapidly as desirable. Due to my method it is possible to remove these solids much more rapidly and positively and without disturbance. This makes for much greater capacity per comparable settling areas.

The principal object of my invention is to provide an improved apparatus and method for separating suspended solids from liquids wherein increase in the settling area results in a direct proportionate increase in separation and clear liquid discharge capacity, wherefore a predetermined increase in separation capacity may be attained at a minimum expense and without waste in installation and settling space.

A further object is to provide an arrangement of the foregoing character wherein the mass and clear liquid flow is maintained in one direction and the separated solids are removed by discharge in a direction transversely of the line of mass and clear liquid flow. By such an arrangement, the point of discharge of the clear liquid may be maintained constant with respect to the point where complete settling of the solids takes place, and increase in capacity of the apparatus may be effected by extending the settling surface laterally of the line of liquid and mass flow.

An additional object is to provide separation apparatus of a character embodying a rectangularly-shaped tank divided into superimposed settling chambers so arranged with respect to a feed chamber that the mass and clear liquid is fed lengthwise of such chambers to a fixed point of draw-off at the end thereof opposite the inlet thereto, and embodying scraper means movable sidewise of such chambers, and laterally of the line of mass flow, for slowly moving the settled solids into and discharging the same at the sides of said chambers where the same precipitates into the bottom of the structure and is removed by positively-acting mechanical means. My invention further contemplates the use of scraper means in the feed chamber which is operable to similarly discharge heavier solids which may settle therein.

As will be appreciated, the feed of the mass to be separated is at a comparatively slow rate, wherefore, in the operation of prior multiple superimposed tray (or settlinging compartment) structures the mass tends to collect in concentrated form adjacent the lowermost trays resulting in a wide difference in the concentrations of the mass entering each tray. Consequently, in such prior structures, due to this condition, the rate of settling in the various superimposed trays tends to vary with consequent reduction in the capacity of such structures. A further object of my invention is to provide an improved method of separation wherein the mass to be separated is delivered into a feed chamber and a turbulence is set up therein so as to uniformize the density of the mass throughout the same, wherefore mass of the same general character is delivered to each tray or settling compartment. A material advantage growing out of this improved method is that the rate of settling in each settling compartment is practically the same and the clear liquid may be delivered therefrom into a common discharge or draw-off chamber having one or more draw-off connections. In this way it is possible to obtain simpler and cheaper operation with lesser construction cost.

Other objects are to provide an arrangement which enables one to employ a large number of trays or settling compartments with consequent greater separation capacity, at a lower installation and operating cost; to provide an arrangement wherein the settling capacity is greatly increased per unit of area occupied by the settling apparatus; to provide an arrangement which provides for ready access for cleaning, repair, inspection, etc.; and to provide a simple and inexpensive structure having all of the foregoing advantages and operating with the maximum degree of efficiency.

Other objects and advantages will become apparent as this description progresses and by reference to the drawings wherein I have shown several forms of structure for carrying out my invention.

Generally stated, in the carrying out of my improved method, the mass from which the solids are to be separated is fed at a comparatively slow rate into a feed chamber extending substantially throughout the height and width of the space occupied by the settling chambers or compartments which may be defined as a plurality of superimposed, so-called trays, or the like. This mass of unseparated material is then flowed forwardly through restricted slots in the adjacent ends of the respective settling chambers or trays and thence lengthwise of such chambers toward a clear-liquid draw-off arrangement at the other ends thereof. The flow of the mass through the settling chambers is at a slow rate and during this flow the solids settle upon the floors of such chambers at a rate and in a manner determined by the velocity of flow and by the character of the material being separated. The clear liquid draw-off arrangement is located, preferably, at the upper part of the settling compartments and at a point relatively close to the place where complete settling of the solids takes place so that the time lag between final settling and drawing off of the clear liquid is at the minimum. While the foregoing action is taking place, the settled solids are being scraped or moved slowly sidewise of the settling compartments and in a direction transversely of the line of flow of the mass and clear liquid between the settling chamber inlet and clear liquid draw-off connection. This is, preferably, accomplished by means of a slow moving scraper arm in each compartment which moves back and forth over the bottom of the compartment discharging the settling solids at the side of the compartment into compartments or zones segregated and provided for that purpose. As the separated solids are discharged into these side compartments or zones they naturally settle downwardly therein to a point considerably removed from the settling compartments and in which are located mechanical means for positively discharging such solids. In the preferred operation of my invention, the scraper means is moved alternately back and forth over the floor of the settling compartment to discharge the solids at both sides of such compartment.

As the separated solids are scraped to the zones at the sides of the settling compartments some clear liquid is carried along and discharged therewith. Considerable liquid is released in these zones and rises to the top, and my invention provides for draw-off of the clear liquid from the upper portions of these compartments to further attain increased separation capacity. Additional liquid is released from the solids in the bottom or concentration chamber and is withdrawn by suitably provided means.

A preferred form of structure for carrying out my improved method is illustrated in Figs. 1 to 6 inclusive. Specifically, this structure comprises a rectangularly shaped tank 19 having therein vertical and horizontally-positioned partitioning walls 20 and 21 dividing the interior of the tank into a comparatively deep feed chamber 22 and a plurality of superimposed, shallow settling chambers 23 and a bottom, secondary concentrating chamber 23×. The feed chamber 22 communicates with each of the several settling chambers 23 and concentrating chamber 23× through a restricted slot 24 located in the vertical partition wall 20 immediately adjacent the horizontal partition wall or settling surface 21 of each settling chamber. The slot 24 in the concentrating chamber 23× is located above the floor of that chamber to accommodate possible different depth of the sludge or solids level in that chamber where concentration takes place. A draw-off connection 25 leading in the usual manner to any desired form of discharging means is connected to each settling chamebr 23 at its end opposite the inlet slot 24, and at the upper part thereof, for discharge of clear liquid.

In the use of the structure so far described the mass to be separated may be fed through an inlet pipe 26 into the feed chamber 22 and thence through the slots 24 into the settling chambers. This flow action into the settling chambers takes place at a very slow rate and, by the time the settling chamber contents have reached a predetermined point therein (dependent upon the character of the material treated and the rate of flow), the solids have completely settled to the floor of the settling chamber and from that point clear liquid flows to the draw-off connection 25.

Figure 1:
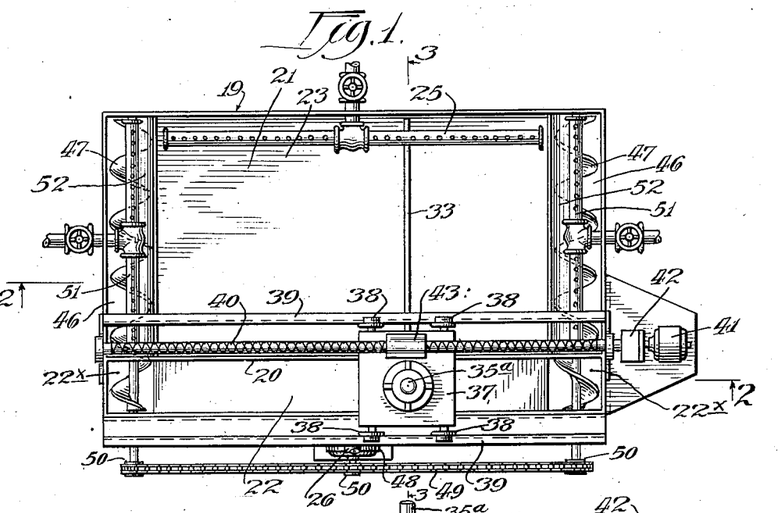
Figure 1 is a top plan view of one form of apparatus adapted to the carrying out of my invention.
Figure 2:
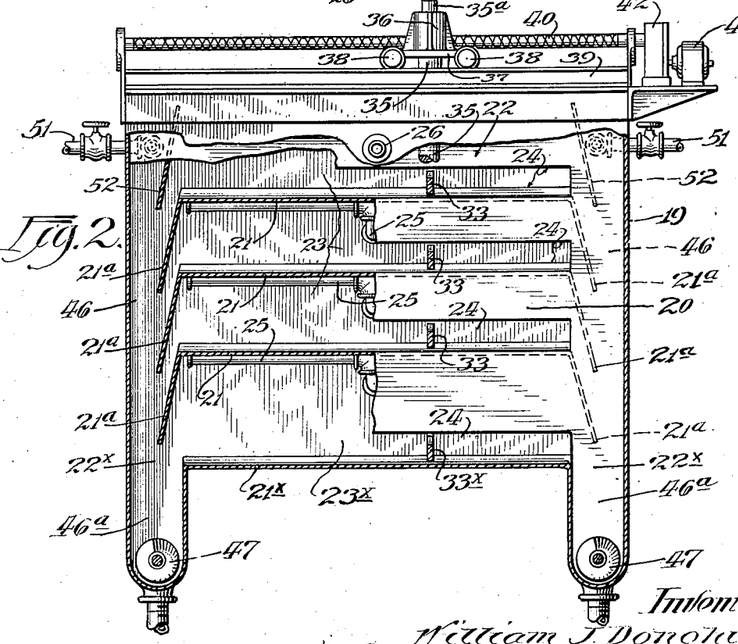
Fig. 2 is a section taken substantially on line 2—2 of Fig. 1.
Figures 3, 5, 6:
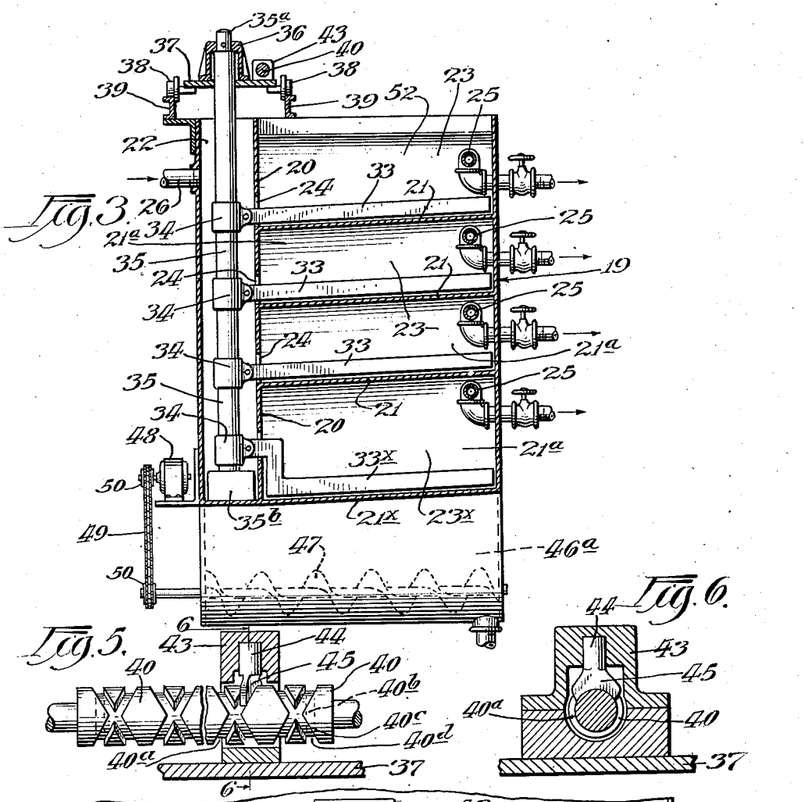
Fig. 3 is a section taken substantially on line 3—3 of Fig. 1.
Fig. 5 is an enlarged view, partially in section of one form of reversing drive shaft structure for moving the scraper arms back and forth.
Fig. 6 is a section taken substantially on line 6—6 of Fig. 5.
Figure 4:
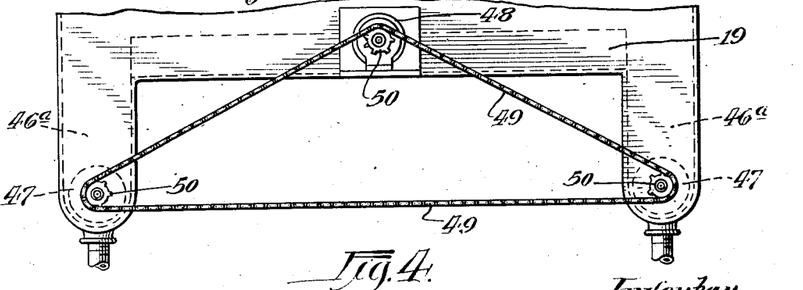
Fig. 4 is an enlarged fragmentary elevational view of the lower portion of the structure shown in Fig. 1, and illustrating the manner of driving the screw conveyors for discharging the separated solids.
Figure 11:
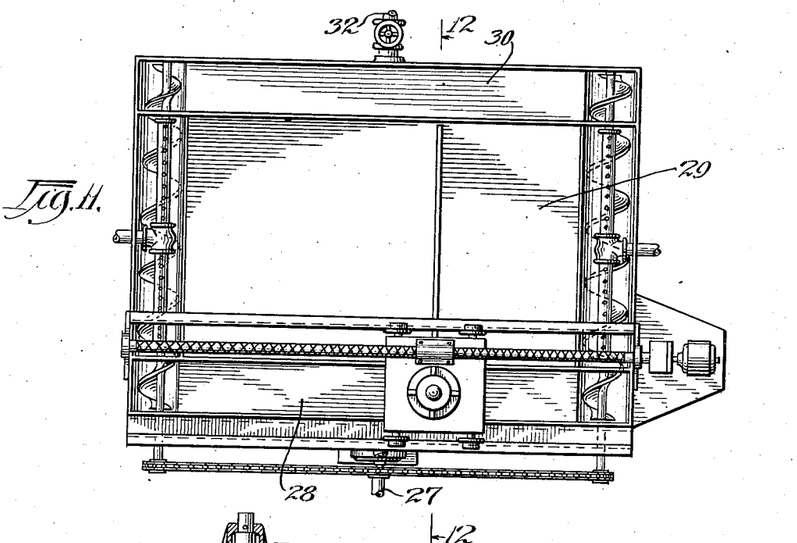
Fig. 11 is a top plan view of an additional form of structure adapted to the carrying out of my invention.
Figure 12:
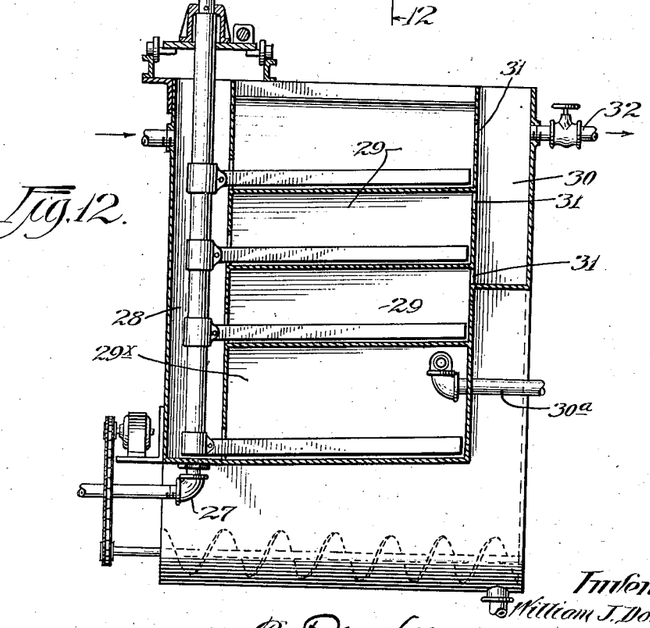
Fig. 12 is a section taken substantially on line 12—12 of Fig. 11.

With the particular arrangement shown in Figs. 1 to 3 inclusive, there will be some tendency for the density of the mass entering the several chambers 23 to vary; however, to avoid such a condition, I may employ the arrangement shown in Figs. 11 and 12 wherein air (from any suitable source not shown) is fed through a suitable conduit 27 into the bottom of the feed chamber 28 setting up in the feed chamber a turbulence and giving to the mass a uniform consistency throughout. Of course, if desired, any suitable form of mechanical stirring or agitating means may be used for this purpose instead of air. Also, in the form of Figs. 11 and 12, due to the uniformity of the mass and the uniformity of the settling action in the respective settling chambers 29, I may eliminate the separate draw-off connection for each settling chamber except the bottom chamber $29^x$ and may provide instead a draw-off chamber 30 communicating with the settling chambers through restricted slots 31, which draw-off chamber may have one or more discharge outlets 32. The liquid will be discharged from the lower concentrating chamber $29^x$ through a suitable draw-off connection $30^a$. As above pointed out, only clear liquid is discharged through the slots 31 (which extend preferably throughout the width of each settling chamber) into the draw-off chamber 30 and, by having the draw-off chamber 30 segregated from the settling compartments 29, it is possible to eliminate all draw-off piping with the exception of draw-off pipe in lowest chamber thus making for lesser cost and facilitating operation.

The solids deposited upon the floors of the settling chambers are removed in the following manner. Referring to Figs. 1 to 3, I provide in each settling chamber a scraper arm 33 ($33^x$ in bottom chamber $23^x$) extending substantially throughout the length of the chamber in close proximity to its floor, and with one end thereof projecting through the respective inlet slot 24 into the feed chamber 22. The ends of these arms which project into the chamber 22 are provided with suitable collars, or the like, 34 which secure the scraper arm to a common support 35 adapted to be moved very slowly back and forth in sidewise direction (with respect to the settling chambers) through the feed chamber 22 to move the scraper arms 33 back and forth along and over the settling surfaces or chamber floors 21. It will be noted that the supported end of the arm $33^x$ in the bottom chamber $23^x$ is crank-shaped to accommodate the position of the inlet slot to that chamber.

Movement of the scraper arm support 35 is accomplished as follows: The upper end $35^a$ of this support is secured in a suitable housing 36 mounted upon a carriage 37 supported by wheels 38 riding upon the sidewise-directed rails 39. This carriage (Figs. 2, 5 and 6) is propelled along by a shaft 40 journaled in the upper portion of the tank 20 and driven by a motor 41 through any suitable form of reducing gearing 42. The shaft 40 is reversely threaded as shown in Fig. 5 and the carriage 37 supports a block 43 in which is rotatably mounted a reversible-driving member 44, the head portion 45 of which is in threaded-drive engagement with the threads of the shaft 40. As will be well understood by rotating the shaft 40 continuously in the same direction the drive head 45 will follow the thread $40^a$ of the shaft until it reaches the end of that thread at the end of the shaft, whereupon continued rotation of the shaft 40 in the same direction will, through the medium of the semi-annular, circumferential groove $40^b$ and the V-shaped deflecting surface $40^c$, cause this head 45 to rotate in the block 43 to a reverse position where it enters and moves along the reversed thread $40^d$. In this manner, the carriage 37, support 35 and scraper arms are moved back and forth from side to side over the floors of the settling compartments.

The sides of the partition members 21 and $21^x$ defining the settling surfaces are turned downwardly as at $21^a$ and project slightly outward toward the adjacent tank wall in overlapping relation with respect to each other. This arrangement defines compartments or zones 46 at the sides of the settling chambers in which the separated solids are received when discharged from the trays and, by arranging the deflecting sides as described, the possibility of the solids from one chamber directly entering the chamber or chambers beneath it is eliminated.

As the solids are deposited in the side chambers 46 they tend to settle downwardly and finally reach the bottom extensions $46^a$ of these chambers (or are further concentrated in lowest chamber) in each of which are located screw conveyors 47 driven by a motor 48 through a single chain 49 and sprockets 50. It will be understood that the solids discharged from the upper settling chambers 23 into the side zones or chambers 46 settle in concentrated form toward the bottoms of the zones 46 and accumulate in concentrated form in the bottom compartment $23^x$. With this arrangement, the solids of greatest density will accumulate on the floor $21^x$ of the bottom chamber $23^x$, thus assuring that the solids removed by the scraper $33^x$ to the sump $46^a$ are at all times the densest and heaviest material present in the apparatus. As the solids are discharged from the settling chambers, some of the liquid will be discharged therewith wherefore a settling action and concentration is continuously taking place in the side deposit chambers 46. To gain advantage of this settling action, I provide draw-off connections 51 located at the upper end of the compartments 46, and I also provide independent baffle members 52 at the sides of the uppermost settling chamber 23 separating the upper part of the chambers 46 and the draw-off connection 51 from such uppermost settling compartment.

In the form of Figs. 1 to 3 inclusive, the draw-off connections may take the form of perforated tubular members (see Fig. 1) extending substantially throughout the width of the respective chambers in which they are located, which members are connected to suitable valve-controlled conduits leading therefrom.

The feed chamber 22 is connected to the sumps $46^a$ through bottom openings $22^x$ (Fig. 1) at the opposite sides of such chamber. Any solids settling in the feed chamber 22 are swept sidewise by a scraper $35^b$ carried by the lower end of the scraper arm support 35 located immediately adjacent the floor of chamber 22. The back and forth movement of support 35 consequently discharges such solids through bottom openings $22^x$ into the sumps $46^a$ where the same are discharged by conveyors 47.

The objects and advantages of my invention as hereinabove stated will be obvious from the foregoing. Increase in the settling area may be accomplished in the utilization of my invention by merely increasing the width of the tank 19 and settling chambers 23 while retaining the same length of such chambers and the same flow distance between the mass inlet 24 and the clear liquid draw-off 25; and, according to my invention, this increase in capacity of the settling surface will result in a direct proportionate increase in separation capacity. In case of increase of width of the settling chambers, the length of the perforated draw-off pipe 25 is increased accordingly to get an increased draw-off proportionately to the increased settling surface and increased volume of clear liquid. One of the important considerations entering into this feature of my invention is that with my improved method and apparatus it is possible, notwithstanding the increased settling area, to maintain the point of complete settling of the solids and the point of draw-off of clear liquid substantially constant with respect to each other; wherefore, no time-lag element is introduced such as would be occasioned in the increase of the settling area of, say for example, the prior used radial flow type of settling structures. All of the foregoing tends not only toward cheaper installation and operating expense but insures conservation of installation space which is a material item always to be taken into consideration in the installation of structures and systems of this character.

Figure 7:
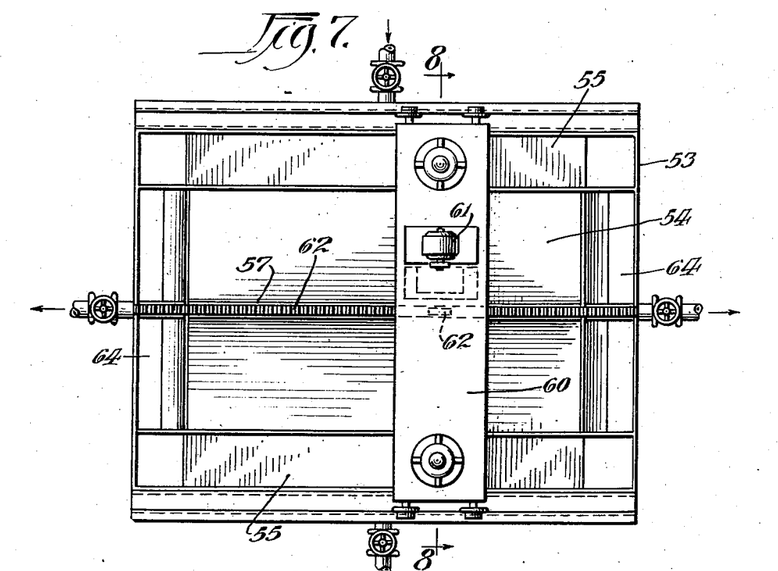
Fig. 7 is a top plan view of another form of structure well adapted to the carrying out of my invention.
Figure 8:
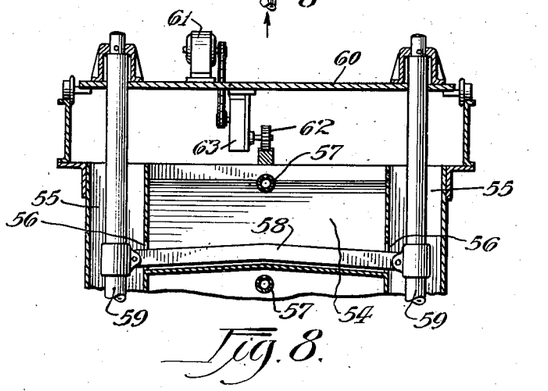
Fig. 8 is a fragmentary section taken substantially on line 8—8 of Fig. 7.

In the form of structure shown in Figs. 7 and 8, I employ a rectangularly shaped tank 53 divided by suitable partition members into a plurality of superimposed settling compartments 54 (sometimes called trays) and feed chambers 55 located at the opposite ends of such chambers. The settling chambers are provided at each end with feed slots 56 similar to the feed slots 24 of the first-described form and the point of draw-off is at the central top portion of each settling compartment as indicated by the position of the perforated tubular draw-off member 57. The settled solids are removed by scraper arms 58 propelled back and forth along the floors of the compartments by suitable supports 59 secured to a carriage 60 bridging the top of the tank from end to end. The supports 59 move back and forth in the feed chambers 55 as in the form of Fig. 1. In this case, one form whereby the carriage 60 is moved back and forth by a motor 61 driving a rack and pinion structure 62 through a reducing gearing 63. The motor 61 is of a reversible type and any well known means (not shown) may be provided for reversing the motor when the scraper arms have reached the end of their stroke at each side of the settling compartment. The side walls of the settling compartments are formed similarly to the side walls of compartments 23 of Fig. 1 providing at the sides thereof compartments 64 receiving the separated solids. Other than above described, the structure and manner of operation of this form of structure is the same as that of Fig. 1. To increase the capacity of the settling surfaces it is only necessary to increase the width of the settling area the length of the draw-off pipe without disturbing the relative distances as between the inlet to the settling chambers and the point of draw-off therefrom; thereby increasing separation capacity proportionately to increase in the settling area.

Figure 9:
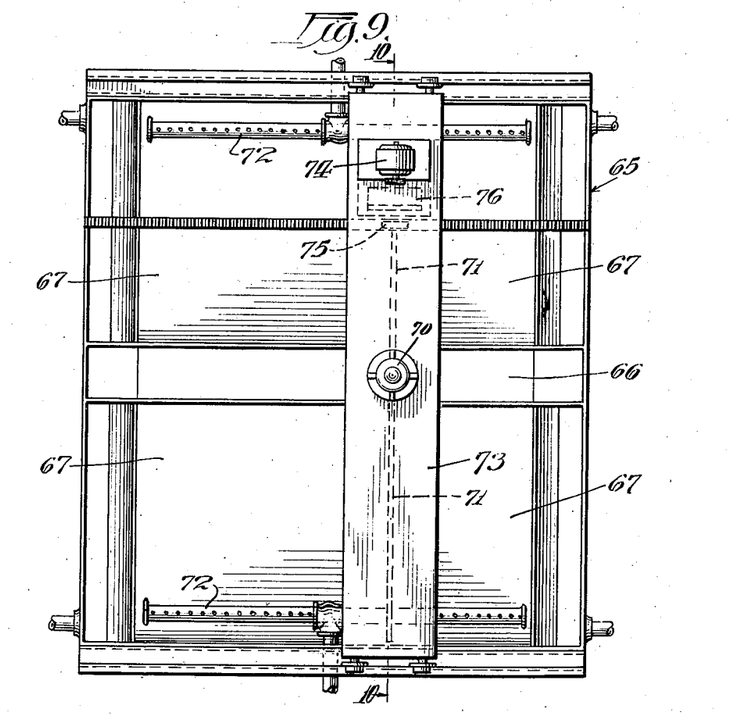
Fig. 9 is a top plan view of still another form of structure adapted to the carrying out of my invention.
Figure 10:
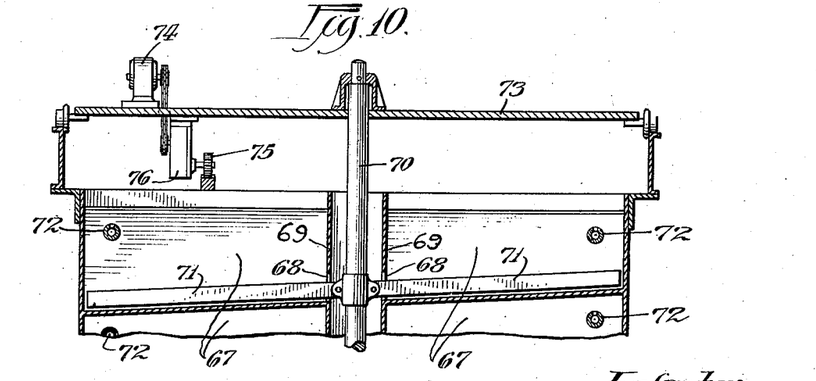
Fig. 10 is a section taken substantially on line 10—10 of Fig. 9.

The form of Figs. 9 and 10 is quite similar to the previously-described forms except that the rectangular tank structure 65 is provided with a central feed chamber 66 having settling chambers 67 located on opposite sides thereof and communicating therewith through feed slots 68 in the vertical partition members 69 defining such feed chamber. A common support 70 carries a plurality of pairs of scraper arms 71, each pair of arms projecting through the horizontally aligned feed slots 68 into the horizontally aligned and opposed settling chambers 67. The draw-off connections 72 are located at the upper part of each compartment at the end opposite the feed inlets 68 thus preserving the same relationship of these parts as described in connection with the previous forms. The support 70 is mounted upon a carriage 73 which is moved slowly back and forth by a motor 74 driving a rack and pinion structure 75 through a reducing gearing 76 in the same manner as described in connection with the form of Figs. 7 and 8. Further operation and advantages of this form of structure are the same as pointed out in connection with previous forms. In this form, to increase the settling area with proportionate increase in separation capacity it is only necessary to extend the width of the settling chambers 67 as explained in connection with the previous forms.

While I have described several forms of structure adapted to the carrying out of my invention, it will be understood that other changes in details and arrangement of parts may be resorted to all without departing from the spirit and scope of my invention as defined by the claims which follow.

I claim:

1. The method of separating suspended solids from liquid which comprises feeding the unseparated mass of solids and liquid into one end of a settling zone, flowing the mass slowly through said settling zone toward its other end while the solids are progressively settling to the bottom of said zone, discharging the separated liquid at the said other end of said zone, and removing the settled solids from the full width of the zone by collecting and moving said settled solids laterally and substantially perpendicularly of the line of flow of said mass in single straight line paths from the settling points of said solids.

2. The method of separating suspended solids from liquid which comprises feeding the mass of solids and liquid into one end of a settling zone, flowing the mass slowly through said settling zone while the solids are settling to the bottom of said zone, discharging the separated liquid at the opposite end of said zone, and alternately moving the settled solids in opposite directions at a uniform depth laterally of the line of flow of said mass and liquid and discharging the solids alternately into distinct zones at the opposite sides of said settling zone.

3. The method of separating suspended solids from a liquid which comprises feeding the unseparated mass into a feed chamber, feeding the mass simultaneously and independently into one end of each of a plurality of superimposed settling chambers, through restricted openings, causing the mass to move slowly through said settling chambers to a liquid discharge point at the opposite end of each said settling chamber while the solids are settling upon the bottoms of said settling chambers, and simultaneously removing the settled solids from the full width of the settling chambers by collecting and moving said settled solids laterally and substantially perpendicularly of the line of flow of said mass in single straight line paths from the settling points of said solids, and discharging the same at the sides of said settling chambers into a separate solids-collecting chamber.

4. The method of separating suspended solids from a liquid comprising slowly and continuously, simultaneously and independently feeding the unseparated mass through restricted paths into one of the ends of each of a plurality of rectangularly defined settling zones throughout the width thereof, causing the mass to flow lengthwise through said zones to a clear liquid discharge point at the other end thereof while the solids are settling on the bottoms of said zones, and alternately discharging the settled solids from said opposite sides of said zones by movement of said solids sidewise of said zones and transversely of the line of lengthwise flow of said mass.

5. The method of separating suspended solids from a liquid which comprises feeding the unseparated mass into a comparatively deep feed zone, simultaneously feeding the unseparated mass from said feed zone into a plurality of independent settling zones, causing the mass in each said settling zone to flow therethrough toward a liquid discharge outlet while the solids are settling in said settling zones, causing the separated liquid to flow from said settling zones into a discharge zone common to said settling zones, moving the settled solids transversely of the line of mass flow to discharge the same from said settling zones, and setting up a turbulence in said feed zone to maintain the consistency of the mass therein to insure uniformity in settling action in each said settling zone.

6. The method of separating suspended solids from a liquid which comprises flowing the unseparated mass into a feed chamber and thence in opposite directions into the ends of settling chambers, causing the mass to flow through said settling chambers to draw-off points at the opposite ends thereof while the solids are settling upon the bottoms of said settling chambers, and removing the settled solids from the full width of said settling chambers by collecting and moving the same laterally and substantially perpendicularly of the line of flow of the mass in single straight line paths from the settling points of said solids and discharging the same at the sides of said settling chambers.

7. Apparatus for separating suspended solids from a liquid which comprises a tank, means dividing said tank into a relatively deep feed chamber and superimposed shallow horizontal settling compartments located substantially throughout the height of said feed chamber, said means including restricted openings leading from said feed chamber into one end of said settling chambers, draw-off means located at the other end of said settling chambers, scraper means extending substantially throughout the length of said settling compartments close to the floors thereof, and means for moving said scraper means sidewise of said compartments to remove solids collected on the floors thereof to discharge said solids at the side of said settling compartments.

8. Apparatus for separating suspended solids from a liquid which comprises a tank, means dividing said tank into a relatively deep feed chamber and superimposed shallow horizontal settling compartments located substantially throughout the height of said feed chamber, said means including restricted openings leading from said feed chamber into one end of said settling chambers, draw-off means located at the other end of said settling chambers, scraper means extending substantially throughout the length of said settling compartments close to the floors thereof, means for moving said scraper means sidewise of said compartments first in one direction and next in the opposite direction to remove solids collected on the floors thereof to discharge said solids at the opposite sides of said settling compartments, and means at the sides of said settling compartments for receiving and finally discharging the separated solids.

9. The method of separating solids from liquid which comprises feeding the unseparated mass into a feed zone, feeding the mass from said feed zone into a settling zone, causing the mass to move slowly through said settling zone to a liquid discharge point while the solids are settling therein, removing the solids settled in said settling zone from the full width of said settling zone by collecting and moving said settled solids laterally and substantially perpendicularly of the line of mass flow in said settling zone in single straight line paths from the settling points of said solids into a solids-discharging zone, and also moving solids settled in said feed zone into said solids-discharging zone.

10. Apparatus for separating suspended solids from a liquid which comprises a tank, partition members therein forming a feed chamber, a settling compartment connected to said feed chamber and a discharge chamber connected to said settling chamber and adapted to receive solids from the latter, a liquid draw-off connection to said settling compartment at a point remote from point of entry of the mass into the settling compartment, a support member movable laterally of the line of flow between the inlet to said settling chamber and said draw-off connection, and means carried by said support member and extending from one side of the bottom of said settling compartment to the opposite side in the direction of the line of flow between said inlet and said draw-off connection, for discharging the settled solids into said discharge chamber.

11. Apparatus for separating suspended solids from a liquid which comprises a tank, means dividing said tank into a relatively deep feed chamber and superimposed shallow horizontal settling compartments located substantially throughout the height of said feed chamber, said means including restricted openings leading from said feed chamber into one end of said settling chambers, draw-off means located at the other end of said settling chambers, and means for removing the collected solids from said settling chambers comprising a scraper member located in each settling compartment near the bottom thereof and projecting through said respective restricted openings into said feed chamber, a common support for said scrapers located in said feed chamber, and movable therein to move said scrapers transversely or sidewise of said settling compartments, and means for moving said support.

12. In apparatus of the character described, means forming a rectangularly-shaped and comparatively shallow and flat bottom settling chamber, means for restrictedly feeding the unseparated mass of solids and liquids into one end of said chamber and for discharging the separated liquid from the other end thereof, a scraper device extending from one side of the bottom of said settling chamber to the opposite side in the direction of the line of flow of the mass in said settling chamber, a carriage movable crosswise of said chamber, said scraper being attached to said carriage, and means for moving said carriage and scraper laterally of said chamber and substantially perpendicularly of said line of flow for discharging the solids settled in said settling chamber at the sides of said settling chamber.

13. In apparatus of the character described, a tank, partition members therein dividing the tank into a feed chamber, a plurality of superimposed settling chambers connected at one end to said feed chamber, a solids-receiving chamber connected to the side of said settling chambers, and a discharge chamber connected to the opposite end of said settling chambers, means in said settling chambers movable sidewise of and transversely with respect to a line between the inlet to and discharge from said chamber for moving the solids collected therein toward and into said receiving chamber, and means for agitating the mass in said feed chamber to maintain the mass at a uniform consistency throughout such feed chamber and in said settling chambers.

14. An apparatus of the character described, which comprises a tank, partition members therein forming a centrally-disposed settling chamber, feed chambers at the opposite ends thereof and solids-discharge chambers at the opposite sides thereof, certain of said partition members having slots therein for feeding the mass from said feed chambers inwardly of and toward the center of said settling chambers, draw-off means at the top central portion of said settling chambers, scraper means located in said settling chamber near the bottom thereof, and means located in said feed chambers for supporting and moving said scraper means sidewise in said settling chamber for discharging the solids collected therein into said side discharge compartment.

15. In apparatus of the character described, a tank, partition members therein dividing the same into a centrally-located feed chamber, settling chambers located on the opposite sides of said feed chamber with their adjacent ends in flow-communication therewith, and solids-receiving chambers at the opposite sides of said settling chambers, draw-off means at the ends of said settling chambers opposite the ends which communicate with said feed chambers, scraper means located in said settling chambers adjacent the bottom thereof, and means located in said feed chamber for supporting and moving said scraper means sidewise of said settling chambers for discharging the solids collected therein sidewise into said solids-receiving compartment.

16. In apparatus of the class described, a tank, means dividing said tank into a separate feed chamber, a settling chamber communicating with said feed chamber through a restricted opening, a solids-receiving chamber at the side of said settling chamber, said feed chamber communicating with said solids-receiving chamber through openings at the sides and in the bottom of the former, draw-off means associated with said settling chamber, means for moving solids collected in said settling chamber into said solids-receiving chamber, and means for moving solids collected in said feed chamber through said bottom openings into said solids-receiving chamber.

17. In apparatus of the class described, a tank, means dividing said tank into a separate feed chamber, a plurality of superimposed settling chambers communicating with said feed chamber through restricted openings, solids-receiving chambers at the opposite sides of said settling chambers, said feed chamber communicating with said solids-receiving chambers through openings at the sides and in the bottom of the former, draw-off means associated with said settling chambers, means for moving the solids collected in said settling chambers into said solids-receiving chambers, and means for moving the solids collected in said feed chamber through said bottom opening into said solids-receiving chambers.

WILLIAM J. DONOHUE.